United States Patent [19]

Alhamad

[11] Patent Number: 5,563,364
[45] Date of Patent: Oct. 8, 1996

[54] ANTI-EXPLOSION PADS AND THEIR METHOD OF USE

[76] Inventor: Shaikh G. M. Y. Alhamad, P.O. Box 31590, Riyadh, 11418, Saudi Arabia

[21] Appl. No.: 414,481

[22] Filed: Mar. 31, 1995

Related U.S. Application Data

[63] Continuation-in-part of Ser. No. 393,504, Feb. 23, 1995, abandoned, which is a continuation of Ser. No. 257,484, Jun. 9, 1994, abandoned, which is a continuation of Ser. No. 784,171, Oct. 25, 1991, abandoned, which is a continuation-in-part of Ser. No. 605,540, Oct. 29, 1990, Pat. No. 5,142,755, which is a division of Ser. No. 417,696, Oct. 5, 1989, Pat. No. 5,001,017, which is a continuation of Ser. No. 280,317, Dec. 6, 1988, abandoned.

[51] Int. Cl.⁶ ............................................. F42D 5/00
[52] U.S. Cl. ........................ 102/303; 428/911; 109/49.5
[58] Field of Search ......................... 102/303; 428/911; 109/49.5

[56] References Cited

U.S. PATENT DOCUMENTS

| | | | |
|---|---|---|---|
| 600,212 | 3/1898 | Woodman | 169/50 |
| 767,723 | 8/1904 | Terpening | 428/256 |
| 869,116 | 10/1907 | Wade | 109/49.5 X |
| 1,086,707 | 2/1914 | Hoagland | 102/303 |
| 1,334,796 | 3/1920 | Robinson | 109/49.5 X |
| 1,439,954 | 12/1922 | Emerson | 109/49.5 X |
| 1,474,390 | 11/1923 | Trowbridge | 109/83 |
| 1,694,542 | 12/1928 | Hedden | 109/49.5 X |
| 1,739,754 | 12/1929 | Foster | 109/49.5 X |
| 2,340,370 | 2/1944 | Doyle | 169/2 |
| 2,836,863 | 6/1958 | Denker | 20/91 |
| 2,931,751 | 4/1960 | DuFresne | 428/29 |
| 3,192,098 | 6/1965 | Phillips | 161/41 |
| 3,284,980 | 11/1966 | Dinkel | 52/600 |
| 3,356,256 | 12/1967 | Szego | 220/88 |
| 3,431,818 | 3/1969 | King | 109/80 |
| 3,437,457 | 4/1969 | Fisher | 29/182.2 |
| 3,459,026 | 8/1969 | Allen et al. | 72/324 |
| 3,465,566 | 9/1969 | Allen | 72/324 |
| 3,492,847 | 1/1970 | Abbott | 102/303 |
| 3,498,404 | 3/1970 | Roberts | 181/33 |
| 3,678,613 | 3/1972 | Cunn | 109/49.5 |
| 4,149,649 | 4/1979 | Szego | 220/88 A |
| 4,179,979 | 12/1979 | Cook et al. | 89/36 A |
| 4,249,669 | 2/1981 | Szego | 220/216 |
| 4,292,882 | 10/1981 | Clausen | 109/49.5 |
| 4,299,872 | 11/1981 | Miguel et al. | 328/117 |
| 4,325,309 | 4/1982 | King et al. | 109/49.5 |
| 4,349,398 | 9/1982 | Kearns et al. | 156/71 |
| 4,361,190 | 11/1982 | Szego | 169/48 |
| 4,454,702 | 6/1984 | Bonilla | 52/745 |
| 4,523,448 | 6/1985 | Sakai et al. | 72/185 |
| 4,557,961 | 12/1985 | Gorges | 428/117 |
| 4,621,397 | 11/1986 | Schrenk | 29/6.1 |
| 4,727,789 | 3/1988 | Katsanis et al. | 109/49.5 |
| 4,785,602 | 11/1988 | Giurlani | 52/309.12 |
| 4,828,932 | 5/1989 | Morimoto et al. | 428/608 |
| 5,225,622 | 6/1993 | Gettle et al. | 102/303 |
| 5,394,786 | 3/1995 | Gettle et al. | 86/50 |
| 5,466,503 | 11/1995 | Dischler | 428/113 X |
| 5,472,769 | 12/1995 | Goerz, Jr. et al. | 428/138 |

FOREIGN PATENT DOCUMENTS

| | | |
|---|---|---|
| 2440982 | 6/1980 | France . |
| 3435457 | 11/1986 | Germany . |
| 554562 | 7/1943 | United Kingdom . |
| 2067105 | 2/1981 | United Kingdom . |

OTHER PUBLICATIONS

Abstracts only: 115870e Japan—Wood Cement Boards Mar. 1984.

Katsanis, D., "Shielding of Facilities for Work with Explosive Materials", Toxic Chemicals & Explosive Facilities, pp. 35–66, 1979.

Szego et al., "Evaluation of Explosafe Explosion Suppression System AFWAL-TR-80-2043", Final Report, 1980.

*Primary Examiner*—Peter A. Nelson
*Attorney, Agent, or Firm*—Charles E. Cates; Frank T. Barber

[57] ABSTRACT

A highly efficient anti-explosion pad comprising multiple sheets of expanded metal net separated by a core layer of porous material such as fiberglass, cotton batting or an assembly of miniature ellipsoids or balls formed from expanded metal net. When covering a wall or other structural element, the stratiform pad effectively dissipates the shock waves and thermal effects of a close range bomb explosion.

24 Claims, 2 Drawing Sheets

ANTI-EXPLOSION PADS AND THEIR METHOD OF USE

This application is a continuation-in-part of application Ser. No. 08/393,504, filed Feb. 23, 1995, which is a continuation of application Ser. No. 257,484, filed Jun. 6, 1994, which is a continuation of application Ser. No. 784,171, filed Oct. 25, 1991 (now abandoned), which was a continuation-in-part of application Ser. No. 07/605,540 filed Oct. 29, 1990, U.S. Pat. No. 5,142,755, which was a division of application Ser. No. 417,696, filed Oct. 5, 1989 (now U.S. Pat. No. 5,001,017, issued Mar. 19, 1991), which was a continuation of application Ser. No. 07/280,317, filed Dec. 6, 1988 (now abandoned).

FIELD OF THE INVENTION

This invention relates generally to anti-explosive pads which may be used to protect structures against the disastrous effects of accidental or otherwise unwanted explosions. More particularly, the invention involves stratiform anti-explosion pads including multiple layers of lightweight expanded metal net. The invention also involves the method of applying such pads for taking advantage of their anti-explosive characteristics.

BACKGROUND

As is well known, the production and use of explosives is an extensive and far-reaching industry. Research through the centuries has developed many useful applications for the known explosives, including the industrial blasting utilized in the mining and road building industries, as well as the harnessing of tiny explosions for use in internal combustion engines. The military use of gun powder and other explosives in rifles, artillery, bombs and the like is also well known.

Concurrently with the benefits derived from the useful application of explosives, the world has been forced to endure the disastrous results which too often occur when explosives are accidentally detonated, such as in the case of explosions in coal mines, fuel tank fields, homes, automobiles, ships, airliners, and the like. Similarly, the world is faced with incidents in which bombs are used for terrorist or other illegal purposes.

There has been a considerable effort to develop products and methods for protecting structures against the destruction which occurs when explosives are detonated in their vicinity, either accidentally or for sinister purposes. Although some progress has been made, the loss of human lives and the destruction of property from explosions continues at an unacceptable rate, and there is continued intense effort to find practical, effective and economical ways of improving anti-explosive products and techniques.

It is an object of the present invention to provide a padding material which possess significantly enhanced explosion suppressing properties.

It is another object of the invention to produce an anti-explosion pad containing extremely lightweight components which serve in a surprisingly effective manner to dissipate the shock waves resulting from the detonation of an explosive material.

It is a further object to provide methods for use of the new anti-explosion pad in the protection of structures which are otherwise subject to severe damage from the explosive force of a detonated bomb.

Other objects and advantages will become apparent as the specification proceeds.

SUMMARY OF THE INVENTION

This invention is based on the discovery that walls and other structural elements can be effectively protected against bomb explosions by interposing between them and the bomb a lightweight pad containing multiple sheets of expanded metal net separated by a layer of porous material. It has been found that the presence of the expanded metal net effectively deflects and dissipates the shock waves resulting from the detonation of the explosive material, so that the wall or other structural element maintains its physical integrity in spite of the explosion.

The product of the present invention therefore is a stratiform anti-explosion pad comprising a first sheet of expanded metal net, a second sheet of expanded metal net, and an inner core layer of air-permeable material separating the said first and second sheets. In a preferred embodiment, the pad is retained between front and back covers, and the sheets of expanded metal net are made from slit foil such as a magnesium alloy metal, while the inner core is a porous material such as fiberglass, cotton batting, or an assembly of miniature spheroids (such as ellipsoids or balls) formed from expanded metal net.

The invention also comprises a method for protecting structures against the impact of explosions comprising interposing between said structure and said explosive a stratiform anti-explosion pad of the nature described above.

DETAILED DESCRIPTION OF THE INVENTION

Figure 1:
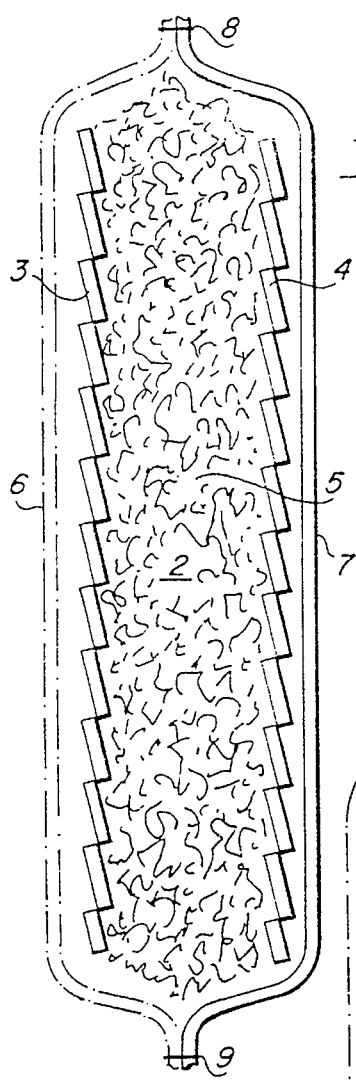
FIG. 1 is a cross-sectional elevation of the anti-explosion pad of the present invention, showing the various component layers.

Referring to the drawings, the basic stratiform anti-explosion pad of the present invention is shown in FIG. 1, wherein the pad 10 contains sheets 3 and 4 made of expanded metal net and separated from each other by an inner core 5 made of an air-permeable material. Although not essential to the invention, it is desirable for certain purposes to enclose the above pad between front and back covers 6 and 7 to maintain the integrity of the pad and prevent slipping or shifting of the elements. For this purpose, the front and back covers 6 and 7 may be bound together by stitching, stapling or other known fastening means at seams 8 and 9.

Figure 3:
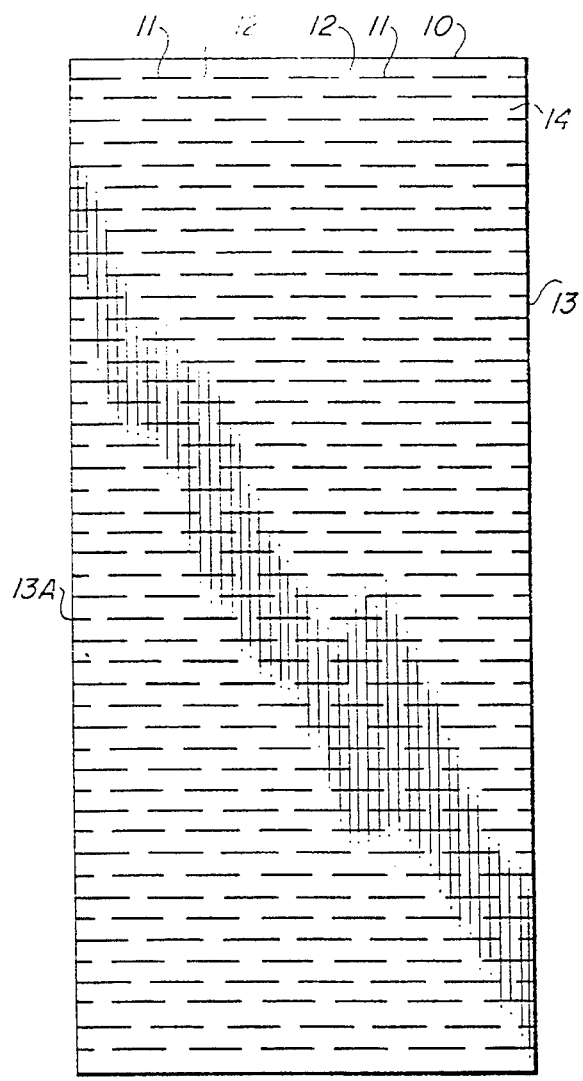
FIG. 3 is a top view of a slitted metal foil sheet, which can be expanded by stretching to provide the expanded metal net usable in the present invention.
Figure 6:
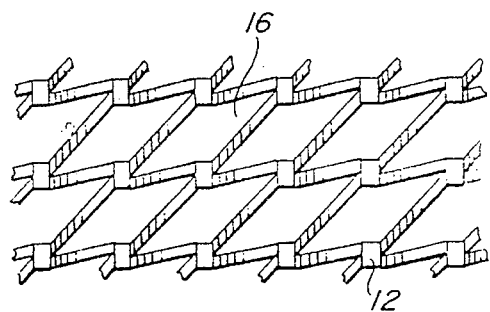
FIGS. 4 through 7 are top views of the expanded metal net, showing the changes in configuration as the slitted sheet is pulled to open up the expanded metal net.
Figure 7:
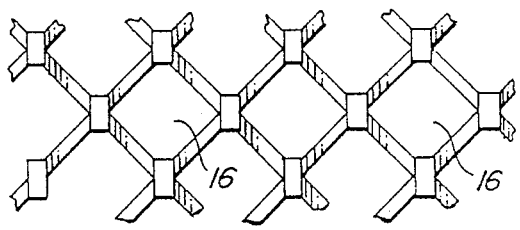

The expanded metal employed in sheets 3 and 4 is formed by slitting a continuous sheet of metal foil in a specialized manner and then stretching the slitted sheet to convert it to an expanded prismatic metal net having a thickness substantially greater than the thickness of the foil. Referring to the drawings, FIG. 3 shows a sheet of metal foil provided with discontinuous slits appropriate for the present invention. The length and width of the sheet may be chosen from any number of practical dimensions, depending on the size of the anti-explosion pad to be produced.

As noted in FIG. 3, sheet 10 is provided with discontinuous slits 11 in spaced apart lines which are parallel to each other but transverse to the longitudinal dimension of the sheet 10. The slits 11 in each line are separated by unslit segments or gaps 12, and it will be noted that the slits 11 in each line are offset from the slits 11 in adjacent lines. Similarly, the gaps 12 in each line are offset from the gaps 12 in adjacent lines. The lines of slits run perpendicular to the longitudinal edges 13 and 13A of the continuous sheet of metal foil. Apparatus for producing the slitted metal foil is described in detail in U.S. Pat. No. 5,142,755, dated Sep. 1, 1992.

Figure 4:
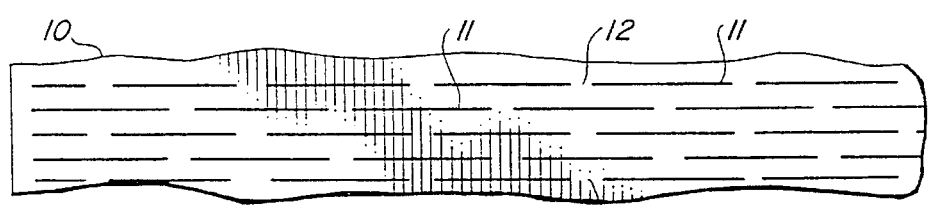
Figure 5:
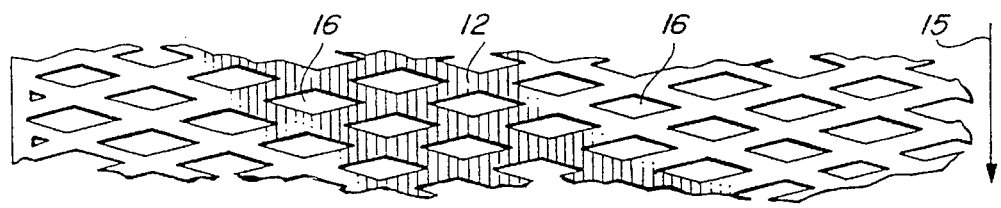

When the slitted metal foil as shown in FIG. 3 is stretched by subjecting it to longitudinal tension, it is converted into an expanded metal prismatic net, usable as elements 3 and 4 of FIG. 1 of the present invention. In the stretching procedure, the horizontal surfaces of foil are raised to a vertical position, taking on a honeycomb-like structure. This conversion is shown in FIGS. 4 through 7 of the drawings. The slitted metal foil 10 is shown in FIG. 4 prior to stretching. When longitudinal tension is applied in the direction of arrow 15, the slits 11 begin to open and are converted to eyes 16, and the product assumes the appearance shown in FIG. 5. The application of more tension causes a greater opening of the slits, and the product expands into the honeycomb-like, prismatic form shown in FIG. 6. When even further tension is applied, the configuration reaches its desired end point, as in FIG. 7. The conversion illustrated in FIGS. 4 through 7 is accompanied by an increase in thickness of the product, the final thickness of the honeycomb product being approximately twice the value of the space 14 between each line of slits.

For the anti-explosion pad usage of the present invention, it is desired that the metal foil be very thin and that the slits in each line and the spaces between the lines be very small. Thus, the thickness of the foil used to produce the metal net should be in the range between 0.028 and 1.0 mm, and the preferred thickness is between 0.028 and 0.2 mm. The length of each slit 11 is in the range between 1 and 2.5 cm, and the unslit sections or gaps 12 between each slit are in the range between 2 to 6 mm long. The distance 14 separating lines of slits may be varied, depending on the thickness desired for the resulting expanded metal net. The distance 14 is ordinarily in the range between 1 and 4 mm, so that the thickness of the resulting expanded metal net is normally in the range between about 2 and 8 mm. The preferred value for distance 14 is either 1 mm or 2 mm.

The kind of metal used in the metal foil may be selected from a wide number of metals or alloys which may be produced in the form of a thin foil. For the purposes of the present invention, it is preferred to use alloys of magnesium with certain other compatible substances. Thus, for example, it is desirable to use an alloy of magnesium with substances such as aluminum, copper, zirconium, zinc, strontium, Rn(electron), silicon, titanium, iron, manganese, chromium, and combinations thereof. Alloys such as the above have the valuable characteristic of not only being lightweight, strong, elastic, heat-conductive, etc., but also the important characteristic of being nonflammable. A particularly useful combination is the alloy of magnesium with aluminum and copper. Another preferred combination is the alloy of magnesium with zirconium and strontium. To a somewhat lesser degree, alloys in which aluminum is substituted for the magnesium, are useful in the practice of the invention. The magnesium alloy used in the invention should contain at least 0.5% by weight of magnesium.

Further advantages are obtained if the expanded metal net is coated with materials such as an alkaline bichromate or an oleate, which are effective in preventing any fire which may be initiated by detonation of the explosive. When heated, these materials emit a dense vapor which envelop the area and assist in preventing the ignition of construction materials in the area.

Although sheets 3 and 4 have thus far been described in terms of being expanded metal net, it is within the contemplation of the invention to use sheets which have been slitted but not expanded at the time the pad is formed. It has been found that, when the pad is subjected to explosion, the forces thus created cause expansion of the slitted sheet, which thus assumes the expanded metal net configuration which is useful in dissipating the effects of the explosion.

The inner core layer 5 may be any suitable air-permeable material such as fiberglass, cotton batting, or other similar non-woven substances. A particularly suitable core material for the layer 5 is an assembly of balls formed from expanded metal net. Such balls are most effective when formed in the shape of small ellipsoids. The ellipsoids are produced by cutting expanded metal net sheets (such as shown in FIGS. 3 through 7) into small segments and then mechanically forming them into the ellipsoid shape. The ellipsoids generally have a short diameter in the range of 20 to 45 mm, and a long diameter in the range of 30 to 60 mm. Apparatus for producing the ellipsoids is described in detail in U.S. Pat. No. 5,207,756, dated May 4, 1993.

The inner core layer 5 is preferably in the range between 1 to 6 inches thick. A thickness less than this provides diminishing protection, and thicknesses above this range, although effective, add bulkiness which is not practical under most conditions.

For certain uses, it is desirable that the layers 3, 4 and 5 be bound together in a cohesive pad by the use of front and back covers 6 and 7, which may be secured at seams 8 and 9. Any suitable material may used for the back cover 7. However, it is essential that the front cover 6 be made of an air-permeable material such as a metal or fiber screen, which will allow the shock and heat waves of the bomb explosion to reach layers of expanded metal net 3 and 4 and allow said layers to diffuse and dissipate the said waves before they reach the structure to be protected. If the front cover 6 is a solid, impermeable material, the shock waves of the detonated explosive will exert their full unattenuated force against the impermeable surface and will destroy not only the protective pad but also the structure intended to be protected. It is essential therefore that the front cover be air-permeable, as indicated, and also that it be placed in position facing the direction from which the explosive forces will originate.

The invention is not limited to the use of only two layers of expanded metal net, separated by a single core layer. For some applications, involving heavier charges of explosives, it is advantageous to employ three or four layers of metal net, separated by matching cores of porous material. It is also useful in some environments to employ two or more sheets of metal net in contact with each other in a single layer.

Figure 2:
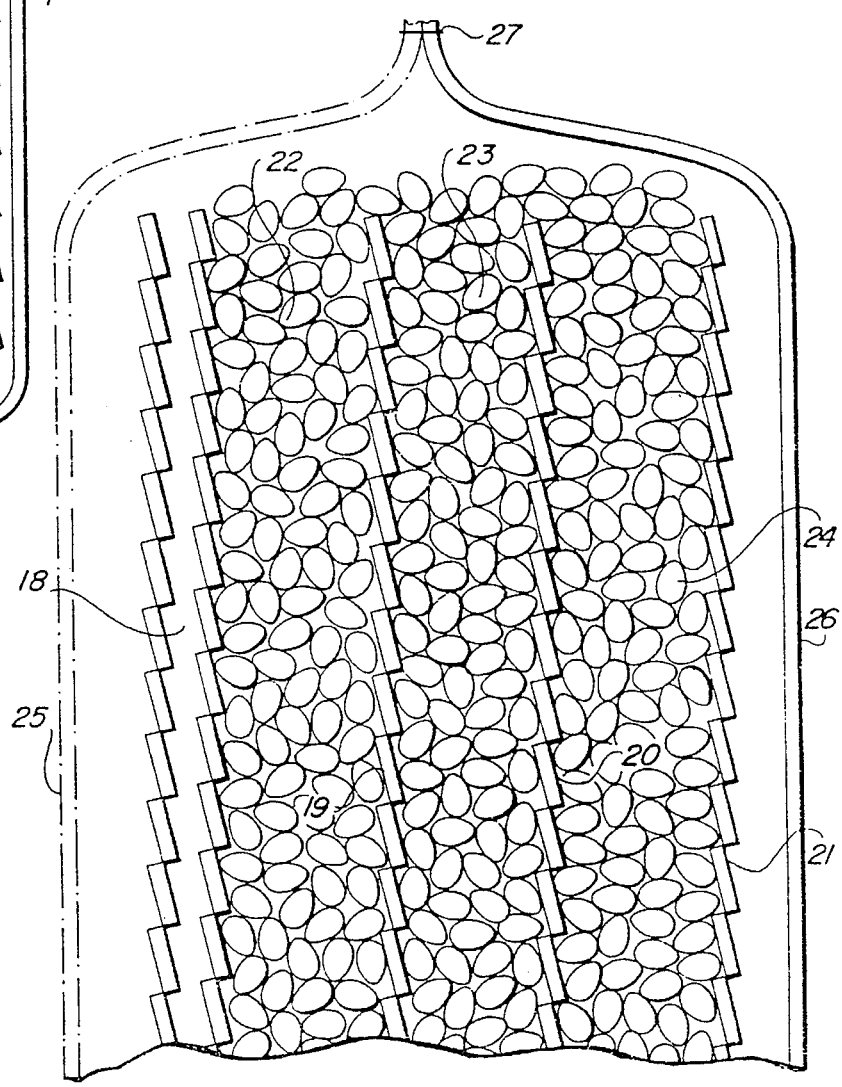
FIG. 2 is a cross-sectional elevation of an optional variation of the explosion pad of the present invention, showing the inclusion of various additional optional layers.

FIG. 2 illustrates an embodiment of the invention, in which a double layer of expanded metal net is employed adjacent the front surface of the pad and additional layers of metal net, separated by layers of ellipsoid filling material, are laid up behind the front double layer. The extra layers of metal net and spacing material provide enhanced protection against explosions. Referring to FIG. 2, the enhanced stratiform anti-explosion pad 17 contains layers 18, 19, 20 and 21 made of expanded metal net and separated from each other by inner cores 22, 23 and 24 made of an assembly of ellipsoids of the type described above. The front layer 18 is composed of a double layer of expanded metal net. The pad 17 is enclosed between front and back covers 25 and 26, which are bound together by stitching, stapling or other known fastening means such as seam 27. As indicated previously in connection with the embodiment of FIG. 1, it is essential that the front cover 25 be air-permeable and that it be placed facing the direction from which the explosive shock waves will come. Although the cores 22, 23 and 24 are illustrated in the form of ellipsoids, which are preferred, it will be understood that the core material may be any suitable air permeable material such as fiberglass, cotton batting, or other similar nonwoven substances. A single pad may, for certain purposes, be made with different core materials in the various core layers, as for example in a pad with core 22 being ellipsoids and the remaining core layers being fiberglass.

Stratiform pads of the nature described above provide remarkable protection against the destructive forces of an explosion. Although the proportion of expanded metal net to the overall weight of the structure being protected is very minute (i.e., between 0.05–1%), the special honeycomb configuration and the heat conductivity of the expanded metal net effectively dissipate the shock waves and thermal effects of a close range bomb explosion. The lightweight nature of the pads is demonstrated in the following table showing the dimensions, weights and porosities of representative barrier pads within the scope of the invention:

TABLE 1

| PAD | PART No. | THICKNESS | | | WEIGHT(lb/ft²) | | | POROSITY | | |
|---|---|---|---|---|---|---|---|---|---|---|
| | | Min | Med | Max | Min | Med | Max | Min | Med | Max |
| A | FM-1 | .001 | .033 | .065 | .044 | .478 | .911 | 30 | 40 | 61 |
| | EF-1 | .079 | .079 | .079 | .036 | .036 | .036 | 98 | 98 | 98 |
| | FG-1 | 2.000 | 2.000 | 2.000 | .333 | .667 | 1.000 | 98 | 98 | 98 |
| | EF-2 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 2.2 | 2.2 | 2.3 | .493 | 1.69 | 2.89 | AVERAGE 96 | | |
| 1 | FM-1 | .001 | .033 | .065 | .044 | .478 | .911 | 30 | 40 | 61 |
| | EF-2 | .158 | .158 | .158 | .072 | .072 | .072 | 98 | 98 | 98 |
| | EL-1 | 1.580 | 1.580 | 1.580 | .400 | .400 | .400 | 98 | 98 | 98 |
| | EF-3 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 1.8 | 1.9 | 1.9 | .596 | 1.46 | 2.33 | AVERAGE 96 | | |
| 2 | FM-1 | .001 | .033 | .065 | .044 | .478 | .911 | 30 | 40 | 61 |
| | EF-2 | .158 | .158 | .158 | .072 | .072 | .072 | 98 | 98 | 98 |
| | EL-1 | 1.580 | 1.580 | 1.580 | .400 | .400 | .400 | 98 | 98 | 98 |
| | EF-3 | .079 | .079 | .079 | .036 | .036 | .036 | 98 | 98 | 98 |
| | EL-2 | 1.580 | 1.580 | 1.580 | .400 | .400 | .400 | 98 | 98 | 98 |
| | EF-4 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 3.5 | 3.5 | 3.6 | 1.032 | 1.90 | 2.77 | AVERAGE 97 | | |
| 3 | FM-1 | .001 | .033 | .065 | .044 | .478 | .911 | 30 | 40 | 61 |
| | EF-2 | .158 | .158 | .158 | .072 | .072 | .072 | 98 | 98 | 98 |
| | EL-1 | 1.580 | 1.580 | 1.580 | .400 | .400 | .400 | 98 | 98 | 98 |
| | EF-3 | .079 | .079 | .079 | .036 | .036 | .036 | 98 | 98 | 98 |
| | EL-2 | 1.580 | 1.580 | 1.580 | .400 | .400 | .400 | 98 | 98 | 98 |
| | EF-4 | .079 | .079 | .079 | .036 | .036 | .036 | 98 | 98 | 98 |
| | EL-3 | 1.580 | 1.580 | 1.580 | .400 | .400 | .400 | 98 | 98 | 98 |
| | EF-5 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 5.1 | 5.2 | 5.3 | 1.47 | 2.34 | 3.20 | AVERAGE 97 | | |

LEGEND:
Min = Minimum
Med = Median
Max = Maximum
–x = Number of components
FM = Fine-mesh metal
EF = Expanded foil
EL = Ellipsoids
FG = Fiber glass It is a feature of the invention that the explosion pads possess a significantly high porosity which enable them to perform efficiently as dispersion type barriers to disperse the multidirectional forces of confined explosions, without eliminating their effectiveness to perform also as deflection type barriers to deflect the lateral forces of unconfined explosions. For the purposes of the present invention, the stratiform pads should have a porosity within the range of 80% to 99%. As indicated in Table 1, it is preferred that the porosity be about 96% to 99%.

The unique open network structure of the stratiform pads of the invention provides an additional benefit in the form of a very high specific internal surface area, which enables the pads to operate effectively as flame arresters without interfering with their explosion protection capabilities. Pads such as those illustrated in Table 1 above have specific internal surface areas in the neighborhood of 320 square feet per cubic foot, which qualifies them as flame arresters for substantially all classes of fuels or flammable vapors. For the purposes of the present invention, the stratiform pads should have a specific internal surface area at least as high as 250 square feet per cubic foot. In the practice of the invention, it is possible to achieve specific internal surface areas higher than 320 square feet per cubic foot, although for most practical purposes such higher areas are unnecessary.

The anti-explosion pad may readily be applied to the surface of structures by means of nails, staples, adhesives, and the like. When in place, the invention has widespread applicability for the protection of structures against explosions. Applications in homes and commercial buildings include covering the walls of garages, furnace rooms, or other areas where fuel tanks or other explosive materials are located. In automobiles, the firewall between the engine compartment and the passenger area may be covered with the anti-explosive pad. For anti-terrorist purposes, the walls of airliner luggage compartments may readily be covered with the product of the invention, to contain and suppress the shock and concussion of a bomb and prevent damage to the controls and other vital structural elements of the plane. The material may be fabricated into walking shields for use by police and firemen at risk from bomb explosions.

The following example describes a specific embodiment which illustrates the invention but should not be interpreted as limiting the scope of the invention:

EXAMPLE 1

Stratiform pads having the configuration shown in FIG. 2 of the drawings were tested to quantify their effectiveness in protecting concrete block walls 6 feet long, 6 feet high and 6 inches thick from explosion. The tests were conducted underground in a high-energy containment bunker.

Each of the barrier pads tested was 2-ft by 2-ft in length and width. The material used in fabricating the pads was 0.004 inch (0.1 millimeter) uniquely slit sheets of alloy foil. As used, the material was deployed either as an an expanded metal net, or as ellipsoids. The ellipsoids were 1.57 inches in diameter, 0.006 pounds in weight, and 98% porosity. The pads consisted of three layers of the ellipsoids and four layers of expanded or unexpanded metal foil. (Some tests were conducted with the four layers of foil in the expanded form and some in the unexpanded form. The unexpanded form provided performance up to 30% better than the expanded form.) The entire assembly was bound together between two layers of 16 mesh aluminum screen, in the following configuration:

Layer of 16-mesh aluminum screen
Layer of 0.004-in. expanded (or unexpanded) foil
Layer of 0.004-in. expanded (or unexpanded) foil
Layer of 1.57-in. diameter ellipsoids of 0.004-in. expanded foil
Layer of 0.004-in. expanded (or unexpanded) foil
Layer of 1.57-in. diameter ellipsoids of 0.004-in. expanded foil
Layer of 0.004-in. expanded (or unexpanded) foil
Layer of 1.57-in. diameter ellipsoids of 0.004-in. expanded foil
Layer of 0.004-in. expanded (or unexpanded) foil
Layer of 16-mesh aluminum screen The tests were conducted to determine the "scaled-distance" rating achieved by the barrier pad being tested. Quantitative damage from explosion has been standardized via a relationship between "overpressure" (pounds per square inch, psig) and "scaled-distance" (ratio of the distance (feet) an explosive charge is from an object to the cube root of explosive weight of the charge (pounds), $ft/lb^{0.33}$). The lower the scaled-distance for a particular barrier, the better the protection. Overpressure is proportional to the extent of damage caused by an explosion. (See Kuchta, J., "Investigation of Fire and Explosion Accidents in the Chemical, Mining, and Fuel-Related Industries—A Manual", U.S. Bureau of Mines Bulletin 680:, 1985.)

The tests were conducted by detonating a specific charge of C4 plastic explosive at a specific distance from the 6-inch concrete block walls, with and without the test barrier between the wall and the explosive, and determining the scaled-distance at which protection was afforded by the barrier.

The testing demonstrated that, when 0.18 lb of C4 plastic explosive (0.25 lb TNT-equivalent) was detonated at 5 inches from a 6-inch concrete block wall, the wall was breached. However, when the barrier pad of the present invention was placed between the explosion and the wall, no breaching or visible damage occurred. This translates into a scaled distance of 0.7 $ft/lb^{0.33}$. The barrier pad thus was demonstrated to have the following characteristics:

| | |
|---|---|
| Weight: | 2.34 lbs per square foot |
| Thickness: | 3.5 inches |
| Porosity: | 98% |
| Scaled Distance: (Explosion Protection) | 0.7 $ft/lb^{.33}$ |

The foregoing testing and characteristics provide the basis for the following interpretations:

1. A 6-in. concrete block wall is shattered when the blast overpressure exceeds 2 pounds per square inch. At a scaled-distance of 0.7 $ft/lb^{0.33}$, the blast overpressure is 1000 pounds per square inch. Thus, it has been demonstrated that the barrier pad of the present invention absorbs substantially all the force of the explosion, reducing overpressure from 1000 to 2 pounds per square inch.

2. Although the barrier pad of the present invention is substantially lighter in weight than most modern barriers, it has a lower scaled-distance and disperses more overpressure than such other modern barriers.

3. A scaled-distance of 0.7 $ft/lb^{0.33}$ is within the 0.25–1.0 $ft/lb^{0.33}$ range provided by steel-reinforcing concrete. Tancreto, J., "Reinforced Concrete in Blast-Hardened Structures", Chapter 5, pp. 92–106, *Design Considerations for Toxic Chemical and Explosive Facilities*, R. Scott and L. Loemeny, Eds., ACS Symposium Series 345, American Chemical Society, 1987. The tests indicate therefore that the barrier pad of the present invention can provide a non-reinforced concrete block wall with a resistance to damage equivalent to a steel-reinforced block wall.

4. The scaled-distance of 0.7 $ft/lb^{0.33}$ provides protection equivalent to that which protects a concrete-block wall from the explosive effects of 200 lb of TNT @ 100 feet. This is one of the requirements for structures housing explosives. Strehlow, R. and Baker, W., "The Characterization and Evaluation of Accidental Explosions", Progress in Energy and Combustion Science 2, 27–60, 1976.

Although preferred embodiments of the invention have been described herein in detail, it will be understood by those skilled in the art that variations may be made thereto without departing from the spirit of the invention.

What is claimed is:

1. A stratiform lightweight anti-explosion pad for protecting against the destructive impact of an explosion, said pad having a porosity in the range of 80 to 99% and a specific internal surface area above 250 square feet per cubic foot, and comprising a first sheet of slitted metal foil, a second sheet of slitted metal foil spaced apart from said first sheet, and an inner core layer of air-permeable material.

2. The anti-explosion pad of claim 1 wherein said inner core of air-permeable material is at least 1 inch thick.

3. The anti-explosion pad of claim 1 wherein said first and second sheets have been stretched to produce expanded metal nets.

4. The anti-explosion pad of claim 1 wherein said sheets of slitted metal foil are made from magnesium alloy foil.

5. The anti-explosion pad of claim 1 wherein said sheets of slitted metal foil have a thickness in the range from about 0.028 to 1.0 mm.

6. The anti-explosion pad of claim 3 wherein said first and second expanded metal net sheets have a thickness in the range from about 2 to 8 mm in their expanded form.

7. The anti-explosion pad of claim 1 wherein said inner core of air-permeable material comprises an assembly of spheroids formed from expanded metal net.

8. The anti-explosion pad of claim 1 wherein said inner core of air-permeable material comprises an assembly of ellipsoids formed from expanded metal net.

9. The anti-explosion pad of claim 1 wherein said pad is retained between front and back covers, said front cover comprising an air-permeable material.

10. The anti-explosion pad of claim 9 wherein said front cover comprises a woven screen.

11. A stratiform lightweight anti-explosion pad for protecting against the destructive impact of an explosion, said pad having a porosity in the range of 80 to 99% and a specific internal surface area above 250 square feet per cubic foot, and having its component layers bound together to form a unified structure containing:

(a) a first sheet of expanded metal net made from magnesium alloy foil;

(b) a second sheet of expanded metal net made from magnesium alloy foil; and (c) an air permeable inner core layer separating said first and second sheets, said inner core layer comprising nestled ellipsoids made from magnesium alloy expanded metal net.

12. The anti-explosion pad of claim 11 wherein said magnesium alloy foil has a thickness in the range from about 0.028 to 1.0 mm.

13. The anti-explosion pad of claim 11 wherein said expanded metal net has a thickness of about 2 to 8 mm in its expanded form.

14. A stratiform anti-explosion pad for use in protecting structures against the impact of explosions, said pad having a porosity in the range of 80 to 99% and a specific internal surface area above 250 square feet per cubic foot, and having its component layers bound together to form a unified structure containing:

(a) a front cover layer formed of an air-permeable material (b) a first anti-explosion layer comprising at least 2 sheets of magnesium alloy expanded metal net laid up in contact with each other and adjacent said front cover layer;

(c) a second anti-explosion layer comprising at least 1 sheet of magnesium alloy expanded metal net, said second anti-explosion layer being spaced apart from said first anti-explosion layer;

(d) an air permeable inner core layer separating said first and second anti-explosion layers, said inner core layer comprising nestled ellipsoids made from magnesium alloy expanded metal net;

(e) a back cover layer bound to and cooperating with said front cover layer to provide a unified structure; and (f) a second air permeable inner core layer separating said second anti-explosion layer and said back cover layer, said inner core layer comprising nestled ellipsoids made from magnesium alloy expanded metal net.

15. A method of protecting a structure against the explosive impact of an explosive, comprising interposing between said structure and said explosive a stratiform anti-explosion pad having a porosity in the range of 80 to 99% and a specific internal surface area above 250 square feet per cubic foot, and comprising a first sheet of slitted metal foil, a second sheet of slitted metal foil spaced apart from said first sheet, and an inner core layer of air-permeable material.

16. The method of claim 15 wherein said inner core of permeable material is at least 1 inch thick.

17. The method of claim 15 wherein said first and second sheets have been stretched to produce expanded metal nets.

18. The method of claim 15 wherein said expanded metal net is made from magnesium alloy foil.

19. The method of claim 18 wherein said magnesium alloy foil has a thickness in the range from about 0.028 to 1.0 mm.

20. The method of claim 17 wherein said expanded metal nets have a thickness of about 2 to 8 mm in their expanded form.

21. The method of claim 15 wherein said inner core of air-permeable material comprises an assembly of spheroids formed from expanded metal net.

22. The method of claim 15 wherein said inner core of air-permeable material comprises an assembly of ellipsoids formed from expanded metal net.

23. The method of claim 15 wherein said pad is retained between front and back covers, said front cover comprising an air-permeable material.

24. The method of claim 23 wherein said front cover comprises a woven screen.

* * * * *